May 8, 1923.
R. F. A. VON BERNEWITZ
DIRECTION INDICATOR
Filed Jan. 28, 1920
1,454,355
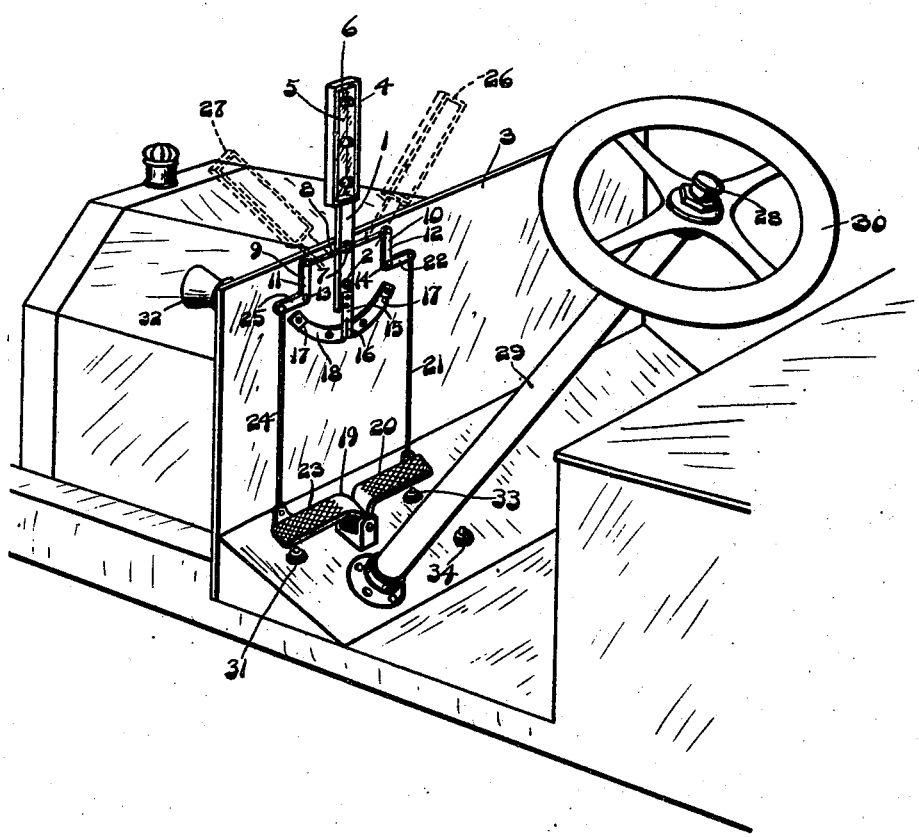
INVENTOR
F. A. Richard Von Bernewitz.

Patented May 8, 1923.

1,454,355

UNITED STATES PATENT OFFICE.

RICHARD F. A. VON BERNEWITZ, OF CINCINNATI, OHIO.

DIRECTION INDICATOR.

Application filed January 28, 1920. Serial No. 354,564.

*To all whom it may concern:*

Be it known that I, RICHARD F. A. VON BERNEWITZ, a citizen of the United States, residing in Cincinnati, in the county of Hamilton and State of Ohio, have invented new and useful Improvements in a Direction Indicator, of which the following is a specification.

An object of my invention is to produce a direction indicator for automobiles which will clearly and unmistakably indicate the intended direction of travel when the vehicle approaches a crossing, branch road, or street, and which may be easily operated by the driver of the vehicle without having to remove his hands from the controlling and steering mechanism of the vehicle, an audible signal being given with each indicated change of direction.

This and other objects are attained in the direction indicator described in the following specification and illustrated in the accompanying drawing which illustrates a direction indicator embodying my invention attached to a motor vehicle.

In the illustrated embodiment of my invention I have shown an arm 1 which is preferably pivotally attached at a point 2 to the dash board 3 of the vehicle. At the upper end of this arm a hollow casing 4 is located, the front and rear sides being closed by glass 5. This glass may be of a desired color, such as ground, clear, red, etc., small electric bulbs 6 being located in the casing connected in a circuit, not shown. Above the pivotal center 2 I have connected with the arm 1, at a point 7, a link 8, the opposite ends of which are pivotally attached to the upper ends of the upstanding arms 9 and 10 of the bell cranks 11 and 12 respectively which are pivoted at points 13 and 14 on the dash board 3. At the lower end of arm 1, below pivot point 2, I have attached a spring 15, the end of which is provided with a detent 16 which is adapted to engage notches 17 located centrally and at the ends of a segment 18 which is secured to the dash board 3 of the vehicle.

To move the indicator to its different positions I have provided a centrally pivoted double foot pedal 19, the right hand end 20 of which is connected by means of a rod 21 to the horizontal arm 22 of bell crank 12 and the left hand end 23 of which is connected by means of a rod 24 with the horizontal arm 25 of bell crank 11. To move the indicator from a central position as shown in full lines in the drawing, and which indicates that the vehicle is to continue in a straight ahead direction, it is but necessary to place the foot upon the right or left hand end of the pedal according to the driver's intention to proceed in a right or left direction. Pressing upon the right hand end 20 of the pedal will swing the indicator to position 26 thereby indicating that the vehicle is to travel in a right hand direction, and pressing upon end 23 of the pedal will swing the indicator to position 27 thereby indicating that the vehicle is to travel toward the left.

Inasmuch as daylight does not necessitate illumination of the indicator the use of the lamps 6 will not be required, but at night the lamps may be illuminated at any time by closing a switch or push button 28 which is preferably located in a convenient position as on the steering column 29 convenient to the steering wheel 30. I have not shown the circuit in which lamps 6 and button 28 are located, because such does not form any part of my invention and is well known in the art.

As an added feature to the disclosure made in the drawing I have provided a push button 31 by means of which audible signal 32 is sounded when arm 1 is swung to position 27 by engagement of treadle 23 with button 31. When the arm 1 is swung to position 26 treadle 20 engages push button 33 and sounds the audible signal. A push button 34 is provided for foot pressure separate from the treadle buttons, the three buttons 31, 33 and 34 being arranged in parallel in the signal 32 circuit, so that any one will sound the signal.

Having thus described my invention what I claim is:

A direction indicator for automobiles comprising an illuminated arm pivotally mounted and adjacent to its lower end for movement transversely of the vehicle, a sector located beneath the pivot and having arm-locating notches therein, a spring extension of the arm adapted to engage the notches of the sector when the arm is swung, a bell crank on each side of the arm having pivots aligned with the pivot of the arm with one branch of each bell crank extending upwardly, a link extending between the upwardly extending branches and connected with the arm above its pivot, the remaining branch of each bell crank extending away from the arm, a rod connected with the outwardly extending branch of each bell crank and depending therefrom and a foot pedal located beneath the arm, pivotally mounted between its ends, and connected at each end to one of the rods.

In witness whereof I affix my signature in the presence of two witnesses.

RICHARD F. A. VON BERNEWITZ.

Witnesses:
   JOSEPH A. SULLIVAN,
   WILLIAM J. SCHULTZ.